Sept. 15, 1931.  A. STUBER  1,823,299
CAMERA LATCH
Filed Dec. 16, 1929  2 Sheets-Sheet 1
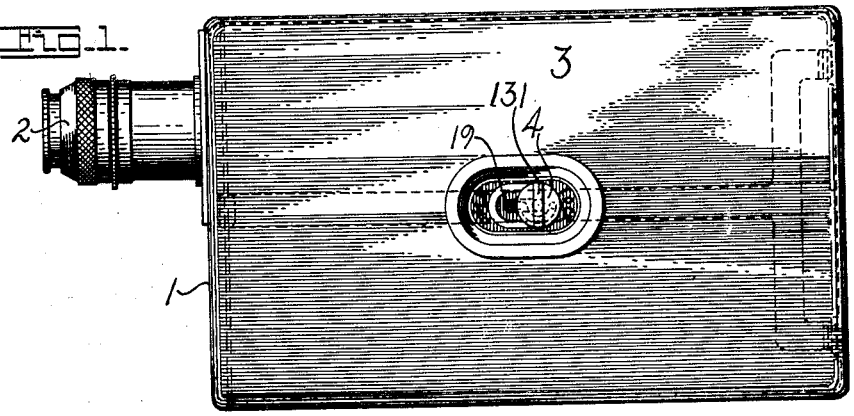
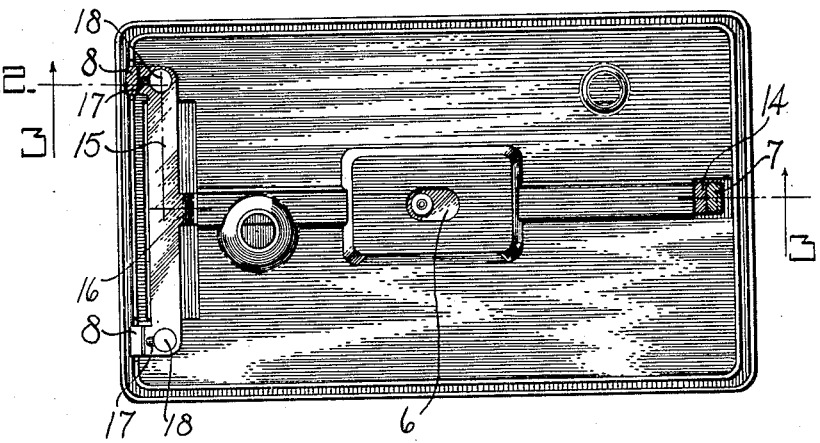
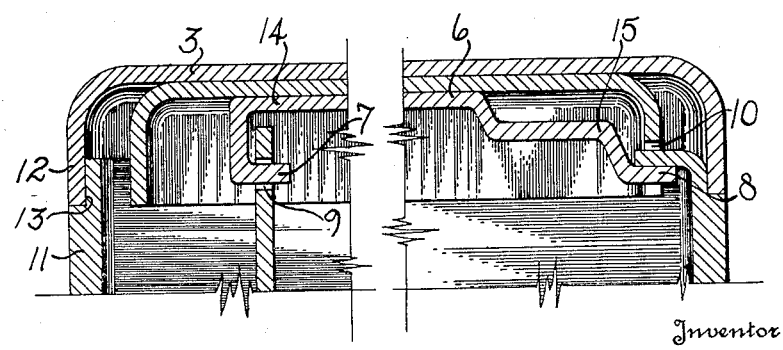
Inventor
Adolph Stuber.
By
Attorneys

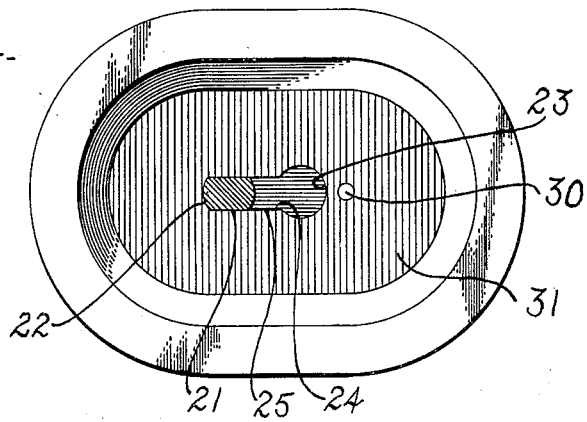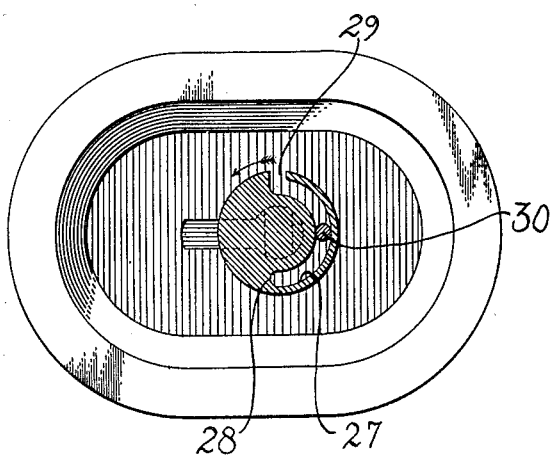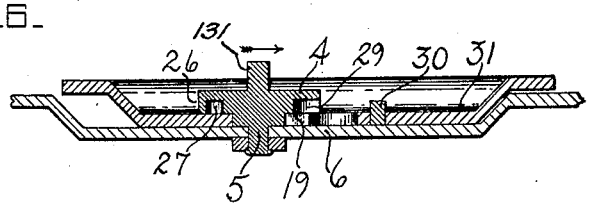

Patented Sept. 15, 1931

1,823,299

UNITED STATES PATENT OFFICE

ADOLPH STUBER, OF ROCHESTER, NEW YORK, ASSIGNOR TO EASTMAN KODAK COMPANY, OF ROCHESTER, NEW YORK, A CORPORATION OF NEW YORK

CAMERA LATCH

Application filed December 16, 1929. Serial No. 414,402.

This invention relates to photography, and more particularly to latches for photographic cameras. One object of my invention is to provide a latch for photographic cameras which may securely hold a removable part in place. Another object of my invention is to provide a latch in which the latching member itself is locked in an operative position, preventing accidental displacement of the removable part. Another object of my invention is to provide a latch for photographic cameras which is simple in operation and which permits a removable part on a camera to be readily attached and released from the camera itself, and other objects will appear from the following specifications, the novel features being particularly pointed out in the claims at the end thereof.

Coming now to the drawings wherein like reference characters denote like parts throughout:

Figure 1 is a side elevation of a camera having a removable part constructed in accordance with and embodying a preferred form of my invention.

Figure 2 is a plan view of the removable side of a camera taken from the camera body, showing the latching mechanism.

Figure 3 is an enlarged fragmentary detail section on line 3—3 of Figure 2.

Figures 4 and 5 are enlarged fragmentary views of the latching mechanism, parts being shown in sections and Figure 6 is an enlarged sectional view through the latching mechanisms shown in Figure 1.

For the purpose of illustrating my invention, I have shown the camera to be of the compact motion picture type and the removable part to be the removable side through which film is loaded into the camera for exposure.

Accordingly in Figure 1 the camera designated broadly as 1 is shown as being provided with the usual objective mount 2 and a removable door 3. By opening this door the camera parts are exposed and film may be loaded into position for exposure as is well known in the art.

In order to hold the door on the camera I provide a latching mechanism which consists on the outside of the door of a handle 4 which may be slid between two positions, in one of which the camera side is latched on the camera and in the other position the camera latch is released.

The handle 4, as best shown in Figure 6, is mounted upon a stud 5 which may turn freely on its support and which is attached to a sliding member 6 which holds one set of latching parts. As best shown in Figure 3, the sliding member 6 is provided with hooklike ends 7 and 8, end 7 being adapted to engage in an aperture 9 and ends 8 being adapted to engage in openings 10. When the hook 7 lies in the aperture 9 and the hooks 8 lie in the apertures 10, the camera side 3 is held against removal from the camera body 11.

The camera side 3 is preferably provided with downwardly extending flanges 12 which fit into a rabbet 13 extending around the camera body 11 so as to make a light tight joint.

As best shown in Figure 3, the sliding member 6 carries a single hook 7 on one end of a bar 14 and carries two hooks 8 at the opposite end, these hooks being formed from a cross bar 15 which is attached to the end 14 of the bar 6. Member 15 is provided with a pair of parallel slots 17 through which studs 18 pass, these studs permitting sliding movement of the bar, but limiting the extent of such movement.

To latch and unlatch the hooks 8 and 7 with their cooperating parts on the camera body as before described the handle 4 is moved between one of two positions by moving the handle through a slot 19 which is cut through the outside of the camera wall. As thus far described, the construction of the camera side latch is substantially like that shown in the prior art.

Coming now particularly to my invention as illustrated in the last three figures the handle 4, which is revolvably mounted on the stud 5, as previously described, is constructed as follows.

The stud 5 is preferably provided with two flat sides 21 and two rounded ends 22, the rounded ends being of such curvature that they are free to turn in the rounded opening 23 at the end of a slot 24. The sides of this slot are parallel and are of such a width that they will permit the flat sides 21 of the stud 5 to slide freely therein. In effect, the sides 25 of the slot form rails which guide the movement of the stud 5.

With this arrangement the handle 5 may slide between an operative and an inoperative position, the stud 5 sliding through the greater part of this movement without turning and being permitted to turn only at one end of the slot, which is the end at which the camera side is latched to the camera.

As best shown in Figure 5, the base 26 of the handle is provided with an arcuate slot 27 which extends through roughly 180 degrees. This slot is closed at one end 28 and is formed outwardly at 29 to extend through the edge wall of the handle. The slot 27 is of such a width that it may engage and slide about a pin 30 which is carried in the recess 31 of the camera wall.

With the parts shown in the position in Figure 6, the handle may be slid in the direction shown by the arrow so that the open end 29 of the slot will be brought into engagement with the pin 30. The handle may be then rotated upon its stud 5 so that the slot 27 is made to pass over the pin 30 until the end 28 of the slot strikes the pin and stops further movement. The handle can be conveniently moved by means of a flange 131 which extends upwardly from the remaining part of the handle.

Obviously this turning movement can only be accomplished when the shaft 21 is in position for the rounded sides 22 to turn in the rounded opening 23.

In Figure 5 the position of the handle is shown when turned a part way round. As is obvious from this figure, the slot 27 engages both sides of the pin 30 so that the handle can not be slid in the slot. Further movement of the handle in the direction shown by the arrow will cause the end of the slot 28 to come to a stop against the pin 30. This turning movement will move the flat sides 21 of the stud 5 in position to slide into the slot 24, but this sliding movement will, of course, be prevented to the engagement of the pin 30 with the slot 27.

The operation of this latching device is extremely simple. With the camera cover latched in place as indicated in Figure 1 and with the handle 4 in the position shown in this figure, in order to release the latch the handle 4 is turned through substantially 180 degrees. This turning movement brings the pin 30 opposite the open end 29 of slot 27 and permits the handle to be brought to its inoperative position, which is at the left of the slot 19, as shown in Figure 1.

When the handle is slid in the slot the end 14, together with the cross bar 15, the hooks 7 and 8 are all removed from their cooperating parts, that is, from the slots 9 and 10. This permits the camera cover 3 to be removed.

To latch the camera cover in place, it is only necessary to reverse this operation, that is, to place the camera cover 3 on the camera body with the flanges 12 engaging the rabbet 13 and then to slide the handle 4 to the right of Figure 1. When the handle has come to a stop in this sliding movement, it is turned since the pin 30 will then be in engagement with the slot 27 and this turning movement is continued until it comes to a stop, at which time the handle is in an operative position in which the camera side is latched firmly on the camera.

It might be noted from Figure 6 that the greater part of the handle 4 is mounted in the recess portion 31 in the side wall of the camera, so that very little of it, to be exact, only the handle 131, extends beyond the plane of the camera wall. By thus mounting the handle 5, there is very little chance of the handle 5 being struck and damaged accidentally.

Having thus described my invention, what I claim as new and desire to secure by Letters Patent is:

1. In a latch for cameras including two relatively movable parts, the combination with a movably mounted latching member, said latching member being slidably mounted on one part, of a complementary latching device on the other part, and means for moving the slidable latching member, including a pivotally mounted handle adapted to slide with the latching member between two positions, a pin and slot on the latching handle and the camera part on which the movably mounted latching member is mounted, said pin and slot being brought into engagement by moving the handle to one extent of its movement, whereby the handle may be turned, engaging the pin in slot and latching the handle in a fixed position.

2. In a latch for photographic cameras including two relatively movable parts, the combination with a movably mounted latching member on one part, of a complementary latching device on the other part, and means for engaging the latching member including a pivotally mounted handle, a support for said pivotally mounted handle including a stud attached to the movably mounted latching member, a groove in the handle, a stud adapted to engage the groove mounted on a camera part, said pin and groove forming a latch for holding the handle in a fixed position when the latching members are cooperating to hold the removable camera part on the camera.

3. In a latch for cameras including two relatively movable parts, the combination with a movably mounted latching member on one part, of a complementary latching device on the other part and means for moving the latching members into engagement, including a movably mounted handle adapted to slide to engage and disengage the latching members and adapted to turn without altering the position of the latching members, a second latch including a pin and slot, one of which is carried by the movable handle and the other of which is carried by a fixed part, said pin and slot being adapted to engage by turning said handle.

4. In a latch for photographic cameras including two relatively movable parts, the combination with a movably mounted latching member on one side, of a complementary latching device on the other part, and means for moving the latching member including a stud and a handle mounted to turn on the stud, said handle being adapted to move the movably mounted latching member by sliding said handle on said camera part and a pin and slot on the handle and camera part adapted to cooperate to latch the camera handle by rotating said handle upon its stud, whereby sliding movement of the movably mounted latching member may be prevented.

Signed at Rochester, New York, this 12th day of December, 1929.

ADOLPH STUBER.